(12) United States Patent
Kothiwale et al.

(10) Patent No.: US 11,765,715 B2
(45) Date of Patent: Sep. 19, 2023

(54) DEVICE FOR THROTTLING DATA TRANSMISSIONS AND A METHOD THEREOF

(71) Applicant: Samsung Electronics Co., Ltd., Gyeonggi-do (KR)

(72) Inventors: Mahantesh Mallikarjun Kothiwale, Bangalore (IN); Jajohn Mathew Mattam, Bangalore (IN); Yunas Rashid, Bangalore (IN); Manasi Ekkundi, Bangalore (IN)

(73) Assignee: Samsung Electronics Co., Ltd

( * ) Notice: Subject to any disclaimer, the term of this patent is extended or adjusted under 35 U.S.C. 154(b) by 214 days.

(21) Appl. No.: 17/106,978

(22) Filed: Nov. 30, 2020

(65) Prior Publication Data
US 2021/0168838 A1 Jun. 3, 2021

(30) Foreign Application Priority Data

Nov. 28, 2019 (IN) .................. 201941048926 PS
Oct. 3, 2020 (IN) .................. 201941048926 CS

(51) Int. Cl.
*H04W 72/1268* (2023.01)
*H04W 28/02* (2009.01)
*H04W 72/21* (2023.01)
*H04W 72/23* (2023.01)
(Continued)

(52) U.S. Cl.
CPC ... *H04W 72/1268* (2013.01); *H04W 28/0278* (2013.01); *H04W 72/21* (2023.01); *H04W 72/23* (2023.01); *H04W 72/51* (2023.01); *H04W 72/569* (2023.01)

(58) Field of Classification Search
CPC ......... H04W 72/1268; H04W 28/0278; H04W 72/048; H04W 72/1242; H04W 72/1284; H04W 72/14
See application file for complete search history.

(56) References Cited

U.S. PATENT DOCUMENTS 6,990,073 B1 * 1/2006 Sandoval ............... H04L 69/16
370/232
2007/0268887 A1 11/2007 Schwartz
(Continued)

FOREIGN PATENT DOCUMENTS

WO    WO 2018/125686    7/2018

OTHER PUBLICATIONS

International Search Report dated Mar. 15, 2021 issued in counterpart application No. PCT/KR2020/017043, 7 pages.
(Continued)

*Primary Examiner* — Dinh Nguyen
(74) *Attorney, Agent, or Firm* — The Farrell Law Firm, P.C.

(57) ABSTRACT

A method of throttling data transmissions in a user equipment (UE) includes determining that a current temperature of the UE is greater than a threshold temperature, identifying a set of data transmissions from a plurality of data transmissions occurring at the UE based on a socket priority of each of the plurality of data transmissions, and throttling the identified set of data transmissions for a time duration for which the current temperature is determined to be greater than the threshold temperature.

10 Claims, 8 Drawing Sheets

(51) Int. Cl.
*H04W 72/51* (2023.01)
*H04W 72/566* (2023.01)

(56) References Cited

U.S. PATENT DOCUMENTS

| | | | | |
|---|---|---|---|---|
| 2008/0089230 | A1* | 4/2008 | Kootstra | H04L 47/193 370/235 |
| 2011/0002262 | A1* | 1/2011 | Wang | H04L 1/1812 370/328 |
| 2013/0027115 | A1 | 1/2013 | Park et al. | |
| 2014/0334299 | A1 | 11/2014 | Ji et al. | |
| 2015/0085841 | A1* | 3/2015 | Sadek | H04W 72/1215 370/336 |
| 2018/0270695 | A1* | 9/2018 | Bergström | H04W 28/0268 |
| 2019/0327359 | A1 | 10/2019 | Guo et al. | |
| 2019/0364492 | A1 | 11/2019 | Azizi et al. | |
| 2021/0076450 | A1* | 3/2021 | Jiang | H04W 74/0833 |

OTHER PUBLICATIONS

Indian Examination Report dated Feb. 27, 2023 issued in counterpart application No. 201941048926, 6 pages.

\* cited by examiner

FIG. 5

| Buffer Occupancy | Data Arrival Rate | Latency | Data Type | Duration – Timers |
|---|---|---|---|---|
| Low | Medium/High | Low | Frequent + Urgent small Data | Low |
| Low | Medium/High | No latency requirement | Frequent + small Data | High |
| Low | Low | No latency requirement | Infrequent + Urgent small data | Medium |
| Low | Low | No latency requirement | Infrequent + small data | High |
| Medium/High | Medium/High | Low | Frequent + Urgent medium/high data | Low |
| Medium/High | Medium/High | No latency requirement | Frequent + medium/high data | Medium |
| Medium/High | Low | Low | Infrequent + Urgent medium/high data | Low |
| Medium/High | Low | No latency requirement | Infrequent + medium/high data | High |

500

DEVICE FOR THROTTLING DATA TRANSMISSIONS AND A METHOD THEREOF

CROSS-REFERENCE TO RELATED APPLICATION(S)

This application is based on and claims priority under 35 U.S.C. § 119 to Indian Provisional Patent Application No. 201941048926 (PS), filed on Nov. 28, 2019 in the Indian Patent Office, and Indian Complete Patent Application No. 201941048926 (CS), filed on Oct. 3, 2020 in the Indian Patent Office, the disclosures of which are incorporated by reference herein in their entireties.

BACKGROUND

1. Field

The present disclosure relates, generally, to data transmissions occurring at a user equipment (UE) and, in particular, to throttling data transmissions occurring at the UE.

2. Description of Related Art

A network equipment is capable of transmission at a very high power, at least in comparison to a UE. For example, new radio (NR) equipment usually works on a high frequency, which requires more transmission power to have more coverage. Downlink coverage can be maintained and controlled by the power of the network equipment. However, there is a limitation in uplink coverage by the equipment. In order to have more coverage, the equipment will have to transmit a high transmission power based on the distance from an NR base station (gNB).

Generally, modems in a wireless mobile device contribute significantly to overall temperature and current consumption of the device. Within modems, major factors that influence the temperature and current consumption are volume of data being transmitted and received in a given time instance. Accordingly, an uplink (or upload) (UL) and downlink (or download)(DL) data rate directly affect the device temperature (excess heat) and current consumption (battery or power consumption) status. Considering these facts, in the case of mobile devices with fifth generation (5G) modems, an influence of UL and DL data rates on device statuses (i.e., heat and power consumption) should be considered.

For example, if a primary UL leg is configured as NR in non-standalone (NSA), and also in the case of standalone (SA) NR, if there is data transfer required in UL, there will be continuous resource allocation for UL data transfer. Consequently, the temperature of the device will increase based on the amount of data transferred in UL and the transmission power used for transmitting the same. The temperature will be directly proportional to the transmission power used in UL and the data rate. This will result in overheating of the device in an SA NR case. Further, this will also result in overheating of the device in NSA if the NR is not turned off based on the temperature. If the NR is turned off based on the temperature, this will result in utilizing the NR capability for less duration.

Currently, when the device reaches threshold temperature T1, thermal mitigation is applied and both UL and DL are throttled to reduce the power consumption and thus the heat dissipation by modem, delaying further thermal mitigations, for example, total power down of NR modem. The decision to throttle DL and UL is oblivious to the relative criticality of UL/DL data streams from the user's perspective. Both the DL and UL may be throttled by x % of current bandwidth or may be throttled independently of each other but without taking into consideration the priorities of the data streams.

Particularly, there are certain thermal mitigation techniques for throttling the DL and UL throughputs based on the different temperature levels read on the device in a runtime mode. There are known methods where, in both UL and DL (either simultaneously or independently), the number of carriers (CA/CC) is reduced dynamically with the wireless resource blocks allocation by the network per carrier, and the number of layers (multiple input multiple output (MIMO) to single input single output (SISO)) is reduced in runtime. These methods usually control the current consumption as well.

However, the existing methods operate only in the modem space and do not consider the impact of DL and UL data rate throttling on "critical" applications, "data rate" applications, and "latency sensitive" applications which execute outside the modem space. Further, the existing techniques do not get the consent from application space. For example, a particular time duration may be very critical for an application and/or a set of applications running may be DL data rate sensitive or UL data rate sensitive at any given duration of time.

Further, existing methods do not utilize the opportunity of throttling UL data, as it could be less sensitive for a duration of time and therefore, allowing a critical DL data rate flow. Similarly, the existing techniques do not utilize the opportunity of throttling DL data, as it could be less sensitive for a duration of time, and hence allowing critical UL data rate flow. Moreover, the existing techniques do not utilize the opportunity of alternatively adjusting the UL and DL data rate based on application need/affordability of running applications. In addition, this will result in degraded user experience as the throttled speeds will be insufficient in some cases to suffice the bandwidth requirements of the user.

Thus, there is a need for a solution that overcomes the above deficiencies.

SUMMARY

The present disclosure has been made to address the above-mentioned problems and disadvantages, and to provide at least the advantages described below.

According to an aspect of the disclosure, a method of throttling data transmissions in a UE is provided. The method includes determining that a current temperature of the UE is greater than a threshold temperature. The method further includes identifying a set of data transmissions from a plurality of data transmissions based on a socket priority of each of the plurality of data transmissions, and throttling the identified set of data transmissions for a time duration for which the monitored current temperature is determined to be greater than the threshold temperature According to another aspect of the disclosure, a method of throttling a plurality of uplink data transmissions in a UE is provided. The method includes determining that a current temperature is greater than a threshold temperature. The method further includes throttling the plurality of uplink data transmissions based on a UE-defined transmission cycle in response to determining that the current temperature is greater than the threshold temperature, transmitting a plurality of data packets corresponding to the plurality of uplink data transmissions during an ON period of the transmission cycle, and suspending the transmission of the plurality of data packets corresponding to the plurality of uplink data transmissions during an OFF period of the transmission cycle.

According to another aspect of the disclosure, a UE configured to throttle data transmission is provided. The UE includes a communication unit; a storage unit; and a controller electrically coupled to the communication unit and the storage unit. The controller is configured to monitor a current temperature of the UE; determine that a current temperature of the UE is greater than a threshold temperature; identify a set of data transmissions from a plurality of data transmissions occurring at the UE based on a socket priority of the plurality of data transmissions; and throttle the identified set of data transmissions for a time duration for which the current temperature is determined to be greater than the threshold temperature.

According to another aspect of the disclosure, a UE configured to throttle a plurality of uplink transmissions is provided. The UE includes a communication unit; a storage unit; and a controller electrically coupled to the communication unit and the storage unit. The controller is configured to determine that a current temperature of the UE is greater than a threshold temperature; and throttle the plurality of uplink data transmissions based on a UE-defined transmission cycle if the current temperature is greater than the threshold temperature. Additionally, the throttling comprises transmitting a plurality of data packets of the plurality of uplink data transmissions during an ON period of the transmission cycle; and suspending the transmission of the plurality of data packets of the plurality of uplink data transmissions during an OFF period of the transmission cycle.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 illustrates a database including records for one or more parameters based on which the transmission cycle is defined, according to an embodiment;

DETAILED DESCRIPTION

Figure 1:
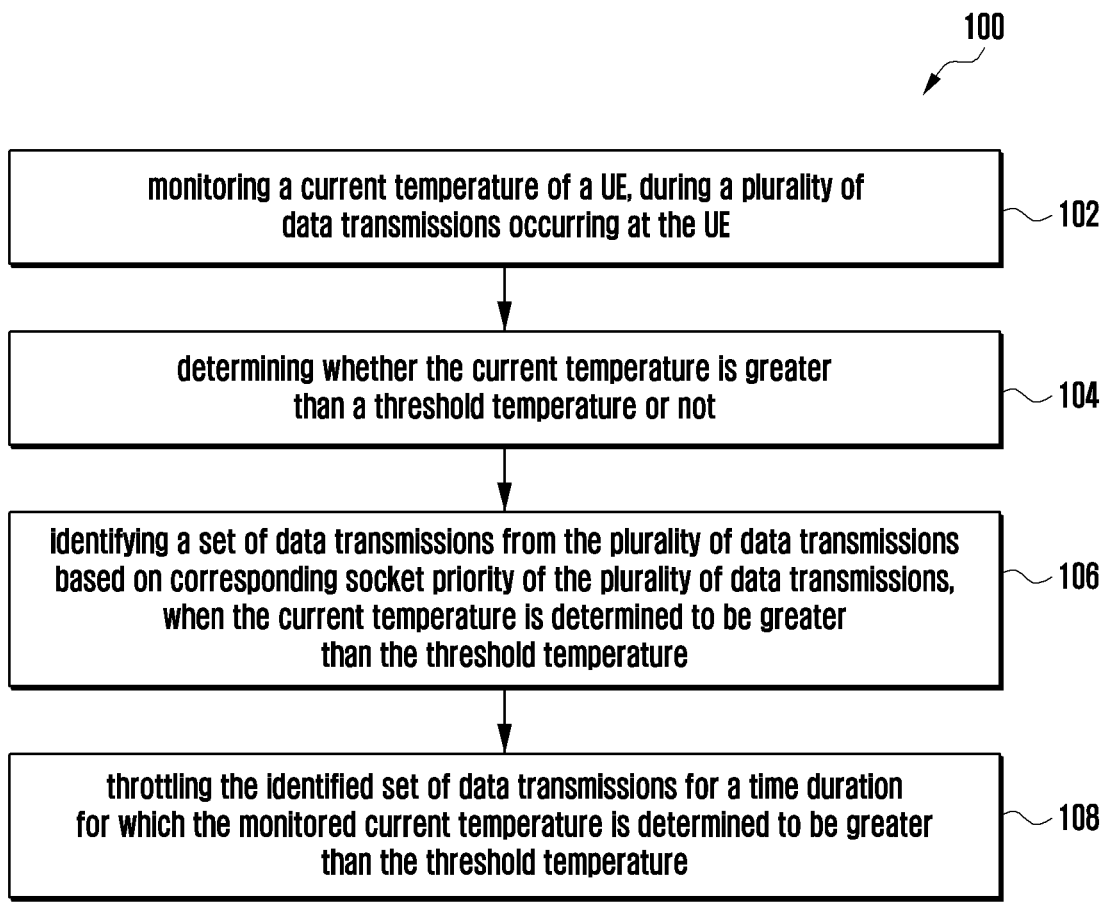
FIG. 1 illustrates a method of throttling data transmissions in a UE, according to an embodiment.

Various embodiments of the present disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

For promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices, sub-systems, elements, structures or components proceeded by "comprises" does not, without more constraints, preclude the existence of other devices, other sub-systems, other elements, other structures, other components, additional devices, additional sub-systems, additional elements, additional structures, or additional components.

Unless otherwise defined, all technical and scientific terms used herein have the same meaning as commonly understood by one of ordinary skill in the art.

FIG. 1 illustrates a method 100 of throttling data transmissions in a UE, according to an embodiment. Examples of the UE may include, but are not limited to, a smartphone, a laptop, a tablet, a smartwatch, and a personal digital assistant. Aspects of the method 100, as described herein, may be implemented by one or more components of a UE as illustrated and described in FIG. 6.

The UE may be connected to one or more application servers, and may be engaged in data transmission with them. Herein, the data transmission may be a UL data transmission and a DL data transmission. As an example, consider a case where a UE is downloading multimedia content from a multimedia rendering server and at the same time the UE is also uploading an attachment. Aspects of the present subject matter may be implemented during such data transmissions occurring at the UE.

Referring to FIG. 1, at step 102, the method 100 includes monitoring a current temperature of the UE, during a plurality of data transmissions occurring at the UE. During the plurality of data transmissions, one or more hardware components, for example, radio frequency (RF) circuitry and processor cores, of the UE may be running in their respective peak performance modes. This may result in excessive heat dissipation. One or more chipsets of the UE which are equipped with thermistors may be configured to measure the temperature of various components/subsystems, such as the RF circuitry and the processor, of the UE. Thus, accordingly, the current temperature of the UE is monitored.

At step 104, the method 100 includes determining whether the current temperature is greater than a threshold temperature or not. The threshold temperature may be predefined and may be determined by the manufacturer of the UE. Thus, different types of UEs may have different threshold temperatures, as defined by respective device manufacturers.

Upon determining that the current temperature is greater than the threshold temperature, a communication processor of the UE may report the event to an AP of the UE. This reporting may be done via an inter processor communication (IPC) command, such as "IPC_CTRL_TM", designated for thermal management.

At step 106, the method 100 includes identifying a set of data transmissions from the plurality of data transmissions based on corresponding socket priority of the plurality of data transmissions, when the current temperature is determined to be greater than the threshold temperature. The socket priorities for each of the plurality of data transmissions may be defined in a transmission control protocol (TCP) layer of the UE. The socket priority may be one of "high" and "low". Additionally or alternatively, the set of data transmissions may include one or more data transmissions whose corresponding socket priority is low.

The plurality of data transmissions occurring at the UE may be of the same type. That is, all the transmissions may be UL data transmissions, or all the transmissions may be DL transmissions. The data transmissions with corresponding low socket priorities are placed in the set of data transmissions. Furthermore, a comparison may be relative. That is, if all the socket priorities are high or all the priorities are low, then a data transmission who relatively has a lower socket priority may be included in the set of data transmissions. Thus, the expression that the set of data transmissions includes a data transmission having a low socket priority also includes data transmissions whose corresponding data transmissions have been determined to be relatively lower than other data transmissions.

Additionally or alternatively, the plurality of data transmissions comprises at least one UL data transmission and at least one DL data transmission. A socket priority of the at least one UL data transmission may be compared with a socket priority of the at least one DL data transmission. The socket priority of the at least one UL data transmission and the socket priority of the at least one DL data transmission may be determined based on a priority of an application associated with each of the at least one UL data transmission and the at least one DL data transmission and may be determined at an application layer of the UE. Accordingly, based on the comparison, a data transmission from the at least one UL data transmission and the at least one DL data transmission that has lower socket priority may be identified. Subsequently, the identified data transmission may be included in the set of data transmissions having a low socket priority.

Once the set of data transmissions are identified, at step 108, the method 100 includes throttling the identified set of data transmissions for a time duration for which the monitored current temperature is determined to be greater than the threshold temperature. The current temperature may be continually compared with the threshold temperature. Accordingly, as long as the current temperature remains greater than the threshold temperature, the identified set of data transmissions may be throttled.

Where each of the plurality of data transmissions is a UL data transmission, the throttling may include buffering a plurality of data packets corresponding to the identified set of data transmissions in a buffer storage space. As mentioned above, the current temperature may be continually compared with the threshold temperature. Accordingly, when the current temperature is determined to be lower than the threshold temperature, the plurality of data packets may be released for UL transmission.

Furthermore, an occupancy of the buffer storage space may be monitored. Accordingly, when the occupancy of the buffer storage space is determined to be greater than or equal to a storage space threshold, the method may include discarding further data packets corresponding to the identified set of data transmissions.

Buffering the UL data transmission having low socket priority results in reducing the resource consumption at the UE. This, in turn, results in lowering the temperature of the resources. Furthermore, the UL data transmission with high socket priority are maintained thereby ensuring support and adequate quality of service (QoS), for such UL data transmissions.

In another embodiment, where each of the plurality of data transmissions is a DL data transmission, the throttling of the identified set of data transmissions may include generating, for each data transmission in the identified set of data transmissions, a control request to adjust a transmission window size associated with the data transmission. The transmission window may be understood as a period of time for which the network node transmits the data packets to the UE. Once generated, the method may include transmitting the generated control request to a network node corresponding to each data transmission in the identified set of data transmission. Upon receiving the request, the network node may be configured to reduce the transmission window size associated with the data transmission. Accordingly, reduced number of data packets corresponding to the data transmission may be received at the UE. This, in turn, results in lowering the resource consumption at the UE, which, in turn, results in lowering of temperature. At the same time, DL data transmission of high priority data transmission is maintained. This helps in maintaining the user experience and QoS level associated with the data transmission.

Furthermore, the plurality of data transmissions may include one or more UL data transmissions and one or more DL data transmissions. The identified set of data transmissions may include the one or more UL data transmissions. In other words, all the UL transmissions may have a low socket priority in comparison to the DL data transmissions. In such a case, an IPC command, such as "IPC_NO_UL_TM", may be triggered by the CP. The aforementioned command may be received by the modem of the CP, and the modem may accordingly perform the throttling as described below.

Upon receiving the above trigger command, the modem may transmit a plurality of data packets corresponding to the one or more UL data transmissions based on a UE-defined transmission cycle. The transmission cycle may be understood as a cycle governing the transmission of data packets in the UL direction. The transmission cycle may be based on at least one of an occupancy status of a buffer configured to store a plurality of data packets corresponding to the one or more UL data transmissions, a data arrival rate of the plurality of data packets at an AP layer of the UE, a data type of the plurality of data packets and a latency requirement associated with each of a plurality of applications generating the plurality of data packets In the above example, the transmission of the plurality of the data packets is suspended for an OFF period of the transmission cycle. This, as established above, reduces the temperature of the UE while maintaining the quality of data transmission having a high socket priority.

Figure 2:
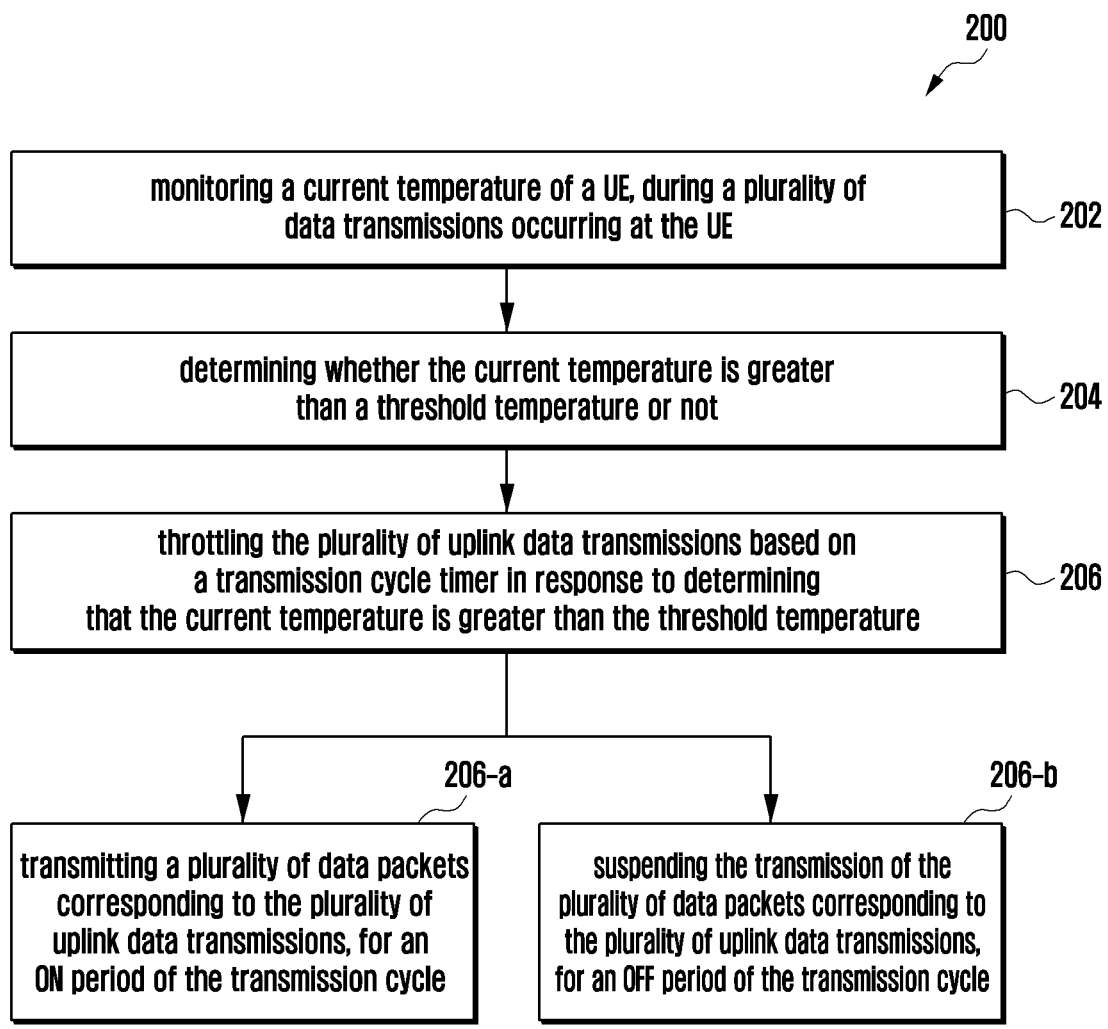
FIG. 2 illustrates a method of throttling UL data transmissions in a UE, according to an embodiment.

FIG. 2 illustrates a method 200 of throttling uplink data transmissions in a UE, according to an embodiment. Examples of the UE may include, but are not limited to, a smartphone, a laptop, a tablet, a smartwatch, and a personal digital assistant. The method 200, as described herein, may be implemented by one or more components of a UE as illustrated and described in FIG. 6.

The UE may be connected to one or more application servers, and may be engaged in UL data transmission with them. Aspects of the present subject matter may be implemented during such UL data transmissions occurring at the UE.

At step 202, the method 200 includes monitoring a current temperature of the UE, during a plurality of data transmissions occurring at the UE. During the plurality of data transmissions, one or more hardware components, for example, the RF circuitry and the processor cores, of the UE may be running in their respective peak performance modes. This may result in excessive heat dissipation. One or more chipsets of the UE which are equipped with thermistors may be configured to measure the temperature of various components/subsystems, such as the RF circuitry and the processor, of the UE. Thus, accordingly, the current temperature of the UE is monitored.

At step 204, the method 200 includes determining whether the current temperature is greater than a threshold temperature or not. The threshold temperature may be predefined and may be determined by the manufacturer of the UE. Thus, different example types of UE may have different threshold temperatures, as defined by respective device manufacturers.

Upon determining that the current temperature is greater than the threshold temperature, a CP of the UE may report the event to an AP of the UE. This reporting may be done, for example, via an IPC command, such as "IPC_CTRL_TM", designated for thermal management.

At step 206, the method 200 includes throttling the plurality of UL data transmissions based on a UE-defined transmission cycle in response to determining that the current temperature is greater than the threshold temperature. At step 206-a, the throttling comprises transmitting a plurality of data packets corresponding to the plurality of UL data transmissions, for an ON period of the transmission cycle. Furthermore, at step 206-b, the transmission of the plurality of data packets corresponding to the plurality of UL data transmissions is suspended, for an OFF period of the transmission cycle.

During the ON period, the packet data convergence protocol (PDCP) may be configured to forward the data to lower layers, such as a radio link control (RLC) layer. The ON period and the OFF period, and thus the transmission cycle, may be defined specific to applications based on one or more parameters described below in FIG. 5.

The ON period and the OFF period of the transmission cycle may be based on at least one of an occupancy status of a buffer configured to store a plurality of data packets corresponding to the plurality of UL data transmissions, a data arrival rate of the plurality of data packets from respective plurality of applications generating the plurality of data packets, and a latency requirement associated with each of the plurality of applications.

Controlling the flow of data from the upper layers, such as the PDCP, to the lower layers, such as the RLC, upon determination of a temperature crossing the threshold provides for an advantageous solution. For example, a buffer status report (BSR) sent by the UE to the network may indicate that the temperature has crossed the threshold, which may help in the network allocating less or no UL grants when there is no BSR. Hence the transmission can be controlled from the UE side which may help in controlling the temperature of the UE.

Furthermore, when the throttling is activated, the method may include requesting an AP layer of the UE to modify a re-transmission timer associated with the plurality of UL transmissions based on the transmission cycle. The modification of the re-transmission timer may include adding the OFF cycle period to the re-transmission cycle timer. This may result in an extended retransmission window length, thereby reducing the number of overall transmission attempts. This may further adjust triggering of the packet drop criteria which may be based on the number of overall transmission attempts.

The throttling of the plurality of UL data transmissions may be done based on a quality indicator associated with said plurality of UL data transmissions. The quality indicator may be 5G quality indicator (5QI). Additionally or alternatively, the quality indicator may be a QoS level of the plurality of UL data transmissions. The throttling may include determining a quality indicator associated with each of the plurality of UL data transmissions. Said determination may be made based on network data including information about the quality indicator of the plurality of UL data transmissions. After determining the quality indicators, the method may further include determining a priority order of the plurality of UL data transmissions based on the quality indicator corresponding to each of the plurality of UL data transmissions. Once the priority order is determined, the method may further include throttling the plurality of UL data transmissions based on the determined priority order. That is, during the ON period, the transmission of the data packets would be based on the priority order.

Figure 3A:
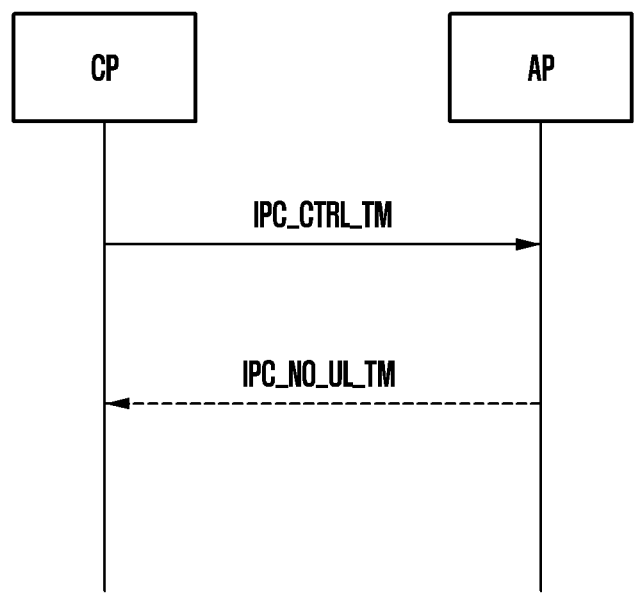
FIG. 3A illustrates a flow diagram indicating exchange of messages between an application processor (AP) and a communication processor (CP) of a UE, according to an embodiment.
Figure 3B:
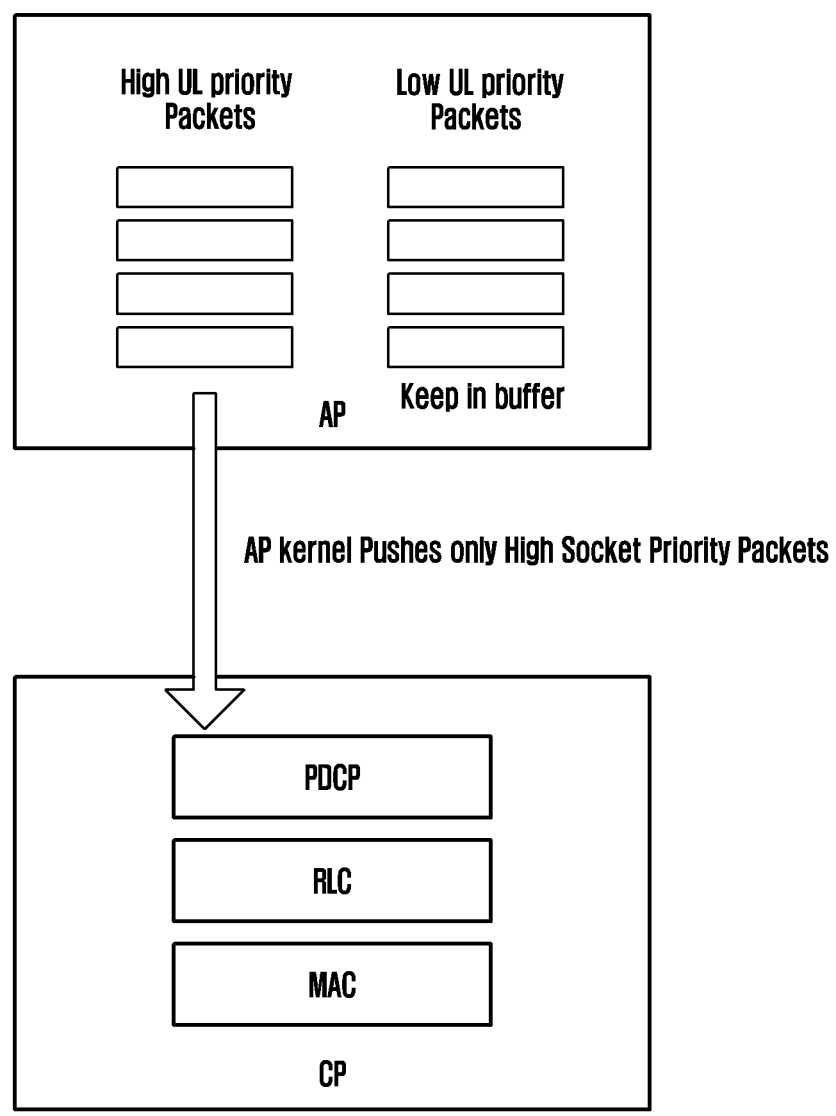
FIG. 3B illustrates an architecture framework depicting interactions between the AP and the CP of the UE, according to an embodiment.

FIG. 3A illustrates a flow diagram indicating exchange of messages between an AP and a CP of a UE, according to an embodiment. FIG. 3B illustrates an architecture framework depicting interactions between the AP and the CP of the UE, according to an embodiment.

Referring to FIGS. 3A and 3B, when the current temperature of the UE is determined to be greater than the threshold temperature, the CP may be configured to transmit a "IPC_CTRL_TM" command to the AP. On receiving said command, the AP may be configured to transmit only those UL packets which have a high socket priority to the CP for UL transmission. Furthermore, the UL packets with low socket priority may be stored in a buffer.

When simultaneous UL and DL transmissions are ongoing at the UE, and the priority of all the UL transmissions is determined to be lower than the DL transmissions, the AP may be configured to transmit a "IPC_NO_UL_TM" command to the CP. In such a case, the upper layers in CP, such as PDCP and/or service data adaption protocol (SDAP), may be configured to control the UL transmissions based on a transmission cycle, as described above.

Figure 4:
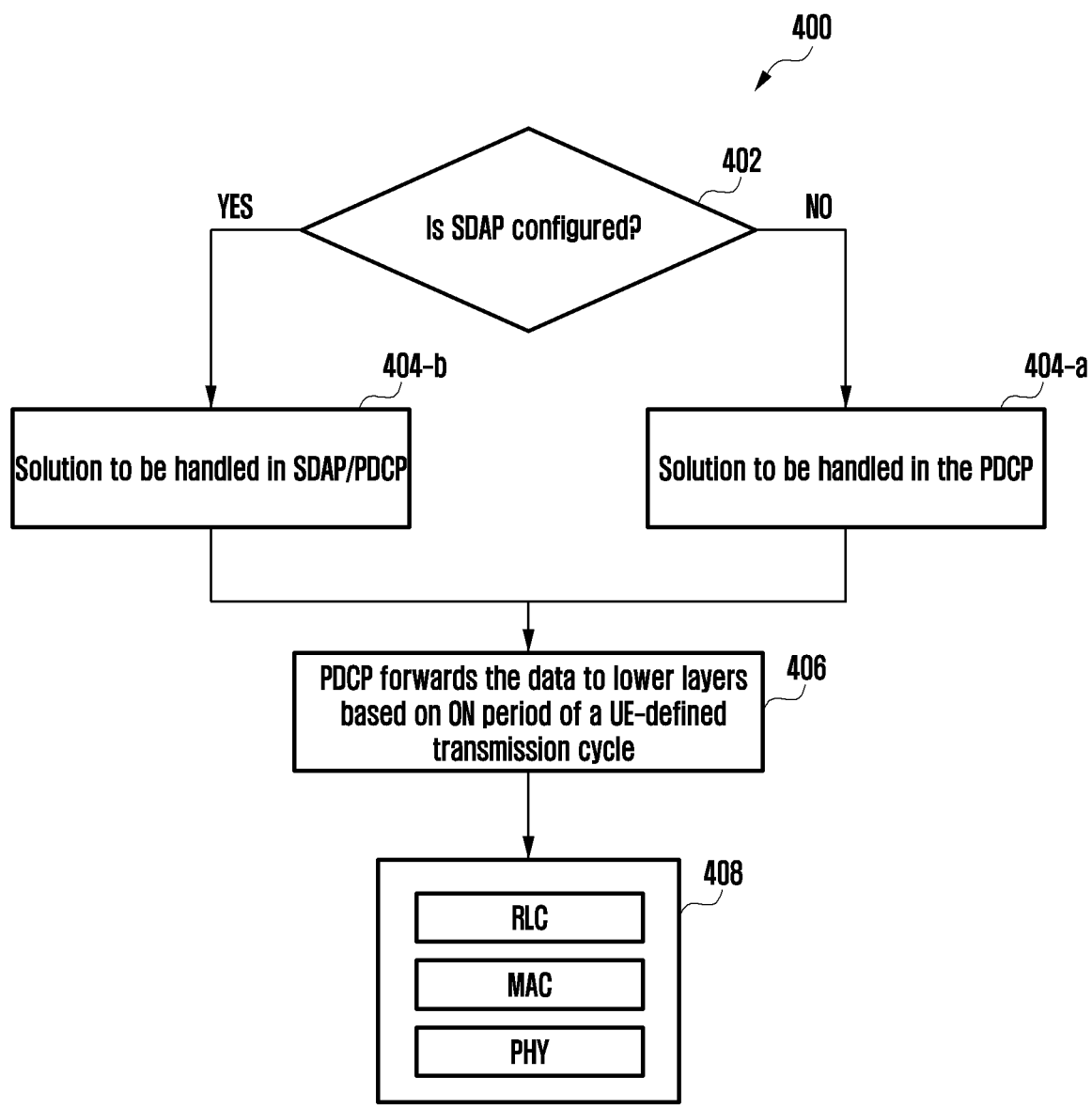
FIG. 4 illustrates a method throttling UL data transmissions, according to an embodiment.

FIG. 4 illustrates a flowchart of a method 400 for throttling UL data transmissions, according to an embodiment. The method 400 may be implemented by a UE, such as the UE illustrated and described in reference to FIG. 6 below. The UE may support one or more of long-term evolution (LTE) technologies, NR technologies, and other communication technologies.

At step 402, the method includes determining whether a an SDAP is configured or not. The SDAP may be determined to be configured when the UE is using network services over NR.

When it is determined that the SDAP is not configured, the method proceeds to step 404-a. At 404-a, the method includes implementing the throttling solution using PDCP. Accordingly, the method then proceeds to step 406 where PDCP forwards the UL data to the lower layers based on a ON period of a UE-defined transmission cycle. The lower layers may include a radio link control (RLC) layer, a media access control (MAC) layer, and a physical (PHY) layer. Furthermore, the forwarding of the data may include prioritizing the data based on the quality indicator associated with the UL data. That is, data with a high priority may be transmitted first. In another example, the data may be transmitted based on a first in first out (FIFO) model.

When it is determined that the SDAP is configured, the method proceeds to step 404-b. At step 404-b, the SDAP takes into consideration the 5QI values associated with the UL packets and forwards the packets to the PDCP. Each evolved packet system (EPS) bearer may be mapped to a data radio bearer (DRB) and logical channel identification (ID). There is a separate quality control indicator (QCI) for each EPS bearer and a separate logical channel priority (LCP) for each logical channel ID mapped to the MAC entity. Based on the QCI and the logical channel priority configured by the network, the SDAP and/or the PDCP can prioritize the data during the data cycle. The PDCP may then forward the UL data packets to the lower layers during the ON period of the transmission cycle.

FIG. 5 illustrates a database 500 including records for one or more parameters based on which the transmission cycle is defined, according to an embodiment. As is shown in FIG. 5, the one or more parameters may include but are not limited to buffer occupancy, data arrival rate, a latency requirement, data type, and duration of a timer. The timers, i.e., the ON period and the OFF period of the transmission cycle, may be defined based on one or more of the aforementioned parameters. Where the duration of the timer is determined to be low, the ON period and the OFF period may be determined either dynamically in runtime or by accessing a statically derived look-up table. Timer values are ideally fine-tuned for any given system having a wireless modem subsystem.

Figure 6:
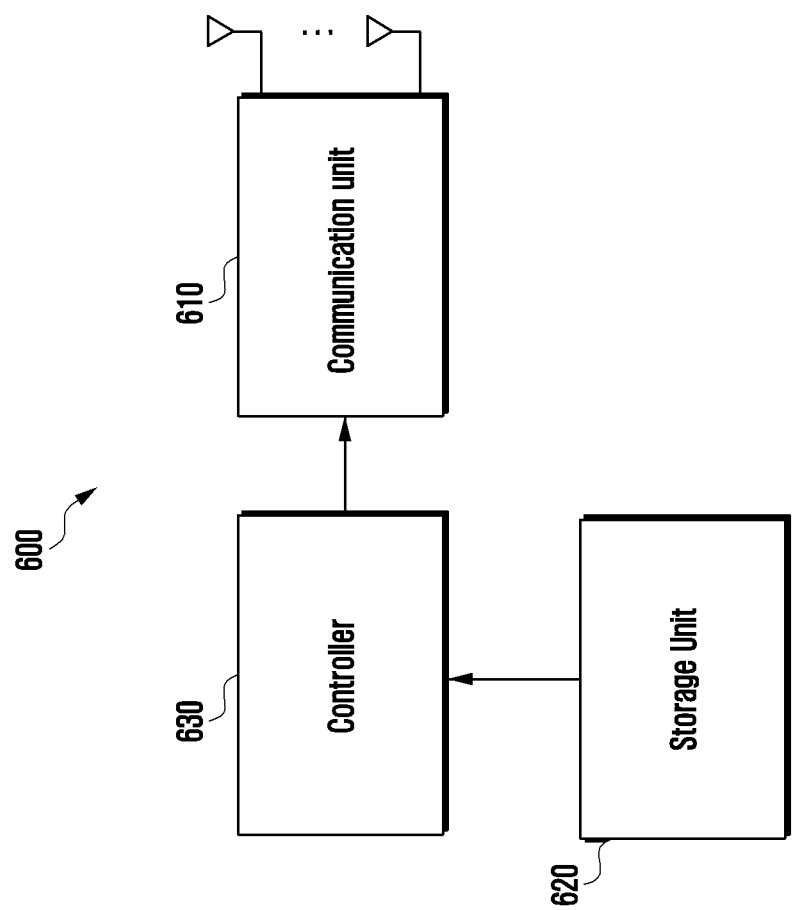
FIG. 6 is a diagram illustrating the configuration of a UE, according to an embodiment.

FIG. 6 is a diagram illustrating the configuration of a UE 600, according to an embodiment. Hereinafter, it is understood that terms including "unit" or ending with "er" may refer to the unit for processing at least one function or operation and may be implemented in hardware, software, or a combination of hardware and software. Furthermore, the UE 600 may be a wireless terminal, such as a smartphone. Alternatively, the UE 600 may be a computing device implemented in vehicles for inter-vehicle communication. In the description below, the UE 600 may interchangeably be referred to as a subject node.

The UE 600 may transmit and receive wireless signals in a millimeter wave (mmWave) band (e.g., 28 gigahertz (GHz), 30 GHz, 38 GHz, or 60 GHz). In this case, to improve a channel gain, the UE 600 may perform beamforming. Here, the beamforming may include transmission beamforming and reception beamforming. That is, the UE 600 may assign directivity to a transmission signal or a reception signal. To this end, the UE 600 may select serving beams via a beam search or beam management procedure. After the serving beams are selected, communication may be performed via resources that are in a quasi co-located (QCL) relationship with resources used for transmitting the serving beams.

The UE 600 may transmit and receive wireless signals in a band other than the mmWave band. In other words, the band at which the UE 600 transmits and receives wireless signals is not limited to the mmWave band. In this case, the UE 600 may perform communication with another entity, without performing beamforming.

The UE 600 may use any suitable radio access technology, such as an LTE technology, an LTE-Advanced technology, a universal mobile telecommunications system (UMTS) technology, a high-speed packet access (HSPA) technology, a global system for mobile communication (GSM) technology, a code-division multiple access 2000 (cdma2000) technology, an NR technology, a worldwide interoperability for microwave access (WiMax) technology, a wireless fidelity (WiFi) technology, and/or any other suitable radio access technology. However, the scope of the disclosure is not limited to these examples and other embodiments could use different radio access technologies.

As shown in FIG. 6, the UE 600 includes a communication unit 610 (e.g., a communicator or a communication interface), a storage unit 620 (e.g., a storage), and a controller 630 (e.g., at least one processor). The terminal may be a UE, such as a cellular phone or another device that communicates over a cellular network (such as a 5G or pre-5G network or any future wireless communication network).

The communication unit 610 may perform functions for transmitting and receiving signals via a wireless channel. For example, the communication unit 610 performs a function of conversion between a baseband signal and a bit stream according to the PHY layer standard of a system. When data is transmitted, the communication unit 610 may generate complex symbols by encoding and modulating a transmission bit stream. Similarly, when data is received, the communication unit 610 may restore a reception bit stream by demodulating and decoding a baseband signal. Furthermore, the communication unit 610 may up-convert a baseband signal into an RF band signal and transmit the same via an antenna, and down-convert an RF band signal received via an antenna into a baseband signal. The communication unit 610 may include at least one of a transmission filter, a reception filter, an amplifier, a mixer, an oscillator, a digital to analog converter (DAC), and an analog to digital converter (ADC).

Also, the communication unit 610 may include or utilize a plurality of transmission and reception paths. In addition, the communication unit 610 may include at least one antenna array including a plurality of antenna elements. From the perspective of hardware, the communication unit 610 may include a digital circuit and an analog circuit (e.g., a radio frequency integrated circuit (RFIC)). Here, the digital circuit and the analog circuit may be implemented as one package. Also, the communication unit 610 may include a plurality of RF chains. In addition, the communication unit 610 may perform beamforming.

The communication unit 610 may transmit and receive a signal as described above. Accordingly, the entirety or a part of the communication unit 610 may be referred to as a "transmitting unit," a "receiving unit," a "transceiving unit," a "transmitter," a "receiver," or a "transceiver." Also, the transmission and reception performed via a wireless channel, which is described herein below, may include the above-described processing performed by the communication unit 610.

The storage unit 620 may store data, such as a basic program, an application program, and configuration information, for operating the UE 600. The storage unit 620 may be configured as a volatile memory, a non-volatile memory, or a combination of a volatile memory and a non-volatile memory. In addition, the storage unit 620 may provide data stored therein in response to a request from the controller 630.

The controller 630 may control overall operations of the UE 600. The controller 630 may transmit and receive signals via the wireless communication unit 610. Further, the controller 630 may record data in the storage unit 620 and read the recorded data. The controller 630 may perform the functions of a protocol stack required by a particular communication standard. To this end, the controller 630 may include at least one processor.

The controller 630 may be configured to monitor a current temperature of the UE 600, during a plurality of data transmissions occurring at the UE 600. Furthermore, the controller 630 may be configured to determine whether the current temperature is greater than a threshold temperature or not. Additionally, the controller 630 may be configured to identify a set of data transmissions from the plurality of data transmissions based on a corresponding socket priority of the plurality of data transmissions, when the current temperature is determined to be greater than the threshold temperature. Each data transmission in the set of data transmissions may have a low socket priority. In addition, the controller 630 may be configured to throttle the identified set of data transmissions for a time duration for which the monitored current temperature is determined to be greater than the threshold temperature Where each of the plurality of data transmissions is a UL data transmission, the controller 630 may be further configured to buffer a plurality of data packets corresponding to the identified set of data transmissions in a buffer storage space. Furthermore, the controller 630 may be configured to release the plurality of data packets for UL transmission, upon determining the monitored temperature to be lower than the threshold temperature.

The controller 630 may be configured to determine an occupancy of the buffer storage space to be greater than or equal to a storage space threshold. Accordingly, the controller 630 may be configured to discard further data packets corresponding to the identified set of data transmissions, in response to determining the occupancy of the buffer storage space to be greater than or equal to the storage space threshold.

Where each of the plurality of data transmissions is a DL data transmission, the controller 630 may further be configured to generate, for each data transmission in the identified set of data transmissions, a control request to adjust a transmission window size associated with the data transmission. Furthermore, the controller 630 may be configured to transmit, for each data transmission in the identified set of data transmissions, the generated control request to a network node corresponding to the data transmission.

Where the plurality of data transmissions comprises one or more UL data transmissions and one or more DL data transmissions, and wherein the identified set of data transmissions comprises the one or more UL data transmissions, the controller 630 may further be configured to transmit a plurality of data packets corresponding to the one or more UL data transmissions based on a UE-defined transmission cycle, wherein the transmission of the plurality of the data packets is suspended for an OFF period of the transmission cycle.

Where the plurality of data transmissions comprises at least one UL data transmission and at least one DL data transmission, the controller 630 may further be configured to compare a socket priority of the at least one UL data transmission with a socket priority of the at least one DL data transmission. Furthermore, the controller 630 may be configured to identify a data transmission from amongst the at least one UL data transmission and the at least one DL data transmission, having a lower socket priority, based on the comparison. Furthermore, the controller 630 may be configured to include the identified data transmission in the identified set of data transmission for throttling.

The UE 600 may be configured to throttle UL data transmissions. The controller 630 may be configured to monitor a current temperature of the UE 600, during a plurality of UL data transmissions occurring at the UE 600. Furthermore, the controller 630 may be configured to determine whether the current temperature is greater than a threshold temperature or not. Additionally, the controller 630 may be configured to throttle the plurality of UL data transmissions based on a UE-defined transmission cycle in response to determining that the current temperature is greater than the threshold temperature. The throttling may comprise transmitting a plurality of data packets corresponding to the plurality of UL data transmissions, for an ON period of the transmission cycle. In addition, the throttling may include suspending the transmission of the plurality of data packets corresponding to the plurality of UL data transmissions, for an OFF period of the transmission cycle.

The controller 630 may be configured to determine the ON period and the OFF period of the transmission cycle based on at least one of an occupancy status of a buffer configured to store a plurality of data packets corresponding to the plurality of UL data transmissions, a data arrival rate of the plurality of data packets from respective plurality of applications generating the plurality of data packets, and a latency requirement associated with each of the plurality of applications.

The controller 630 may further be configured to determine a quality indicator associated with each of the plurality of UL data transmissions. Furthermore, the controller 630 may be configured to determine a priority order of the plurality of UL data transmissions based on the quality indicator corresponding to each of the plurality of UL data transmissions. Furthermore, the controller 630 may further be configured to throttle the plurality of UL data transmissions based on the determined priority order.

Furthermore, the controller 630 may further be configured to request an AP layer of the UE 600 to modify a retransmission timer associated with the plurality of UL transmissions based on the transmission cycle.

As described in FIG. 7 below, the controller 630 may be configured to initiate a communication session for sending a plurality of data packets to a network. The data packets may include at least one of one or more UL data packets and one or more DL data packets. Furthermore, the controller 630 may be configured to assign a higher priority to at least a first set of data packets from among the plurality of data packets based on at least a predetermined priority policy. Furthermore, the controller 630 may detect an increase in device temperature of the UE above a pre-determined threshold during the communication session. Accordingly, the controller 630 may be configured to continue the communication session by sending at least the first set of data packets having the higher priority.

Additionally, the controller 630 may further be configured to continue the communication session by discontinuing sending of at least a second set of data packets having a lower priority. Furthermore, the controller 630 may be configured to detect that the device temperature of the UE is below the pre-determined threshold. In addition, the controller 630 may be configured to resume sending of at least the discontinued second set of data packets having the lower priority.

Figure 7:
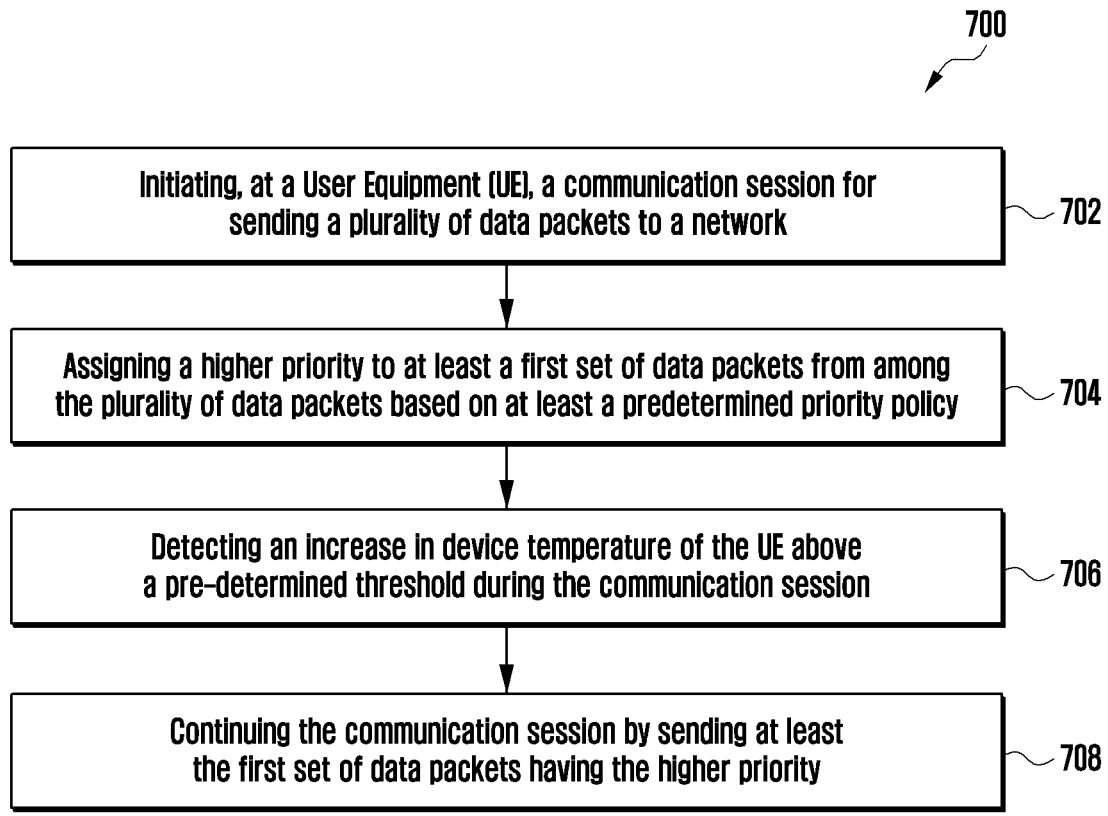
FIG. 7 illustrates a method for thermal based 5G communication management, according to an embodiment.

FIG. 7 illustrates a method 700 of thermal based 5G communication management, according to an embodiment. The method 700 may be implemented in a UE. The UE may include, but is not limited to, a smartphone, a laptop, a tablet, a smartwatch, and a personal digital assistant. Aspects of the method 700 may be implemented by one or more components of a UE as illustrated and described in FIG. 6.

At step 702, the method 700 includes initiating a communication session for sending a plurality of data packets to a network. The communication session may be initiated by a social media application installed and running on the UE. Multiple such sessions may be initiated on the network by one or more applications installed on the UE. The network may be a 5G network.

At step 704, the method 700 includes assigning a higher priority to at least a first set of data packets from among the plurality of data packets based on at least a predetermined priority policy. The predetermined policy may be implemented by the UE for assigning priorities to the data packets pertaining to the communication session. The data packets may include one or more UL data packets and/or one or more of DL data packets. The predetermined priority policy may be defined and/or determined by the UE or the network. The predetermined policy may be based on the service requirements of a service rendered by the application. These service requirements may include, for example, QoS requirements. The UE may assign the priorities to the first set of data packets. A network server or an intermediate server may assign the priorities to the first set of data packets.

At step 706, the method 700 includes detecting an increase in device temperature of the UE above a pre-determined threshold during the communication session. The pre-determined threshold temperature may be defined by the equipment manufacturer of the UE, or equipment manufacturer of one or more components, such as a processor, of the UE. A controller of the UE may detect the increase in device temperature of the UE above the pre-determined threshold as described above.

At step 708, the method 700 includes continuing the communication session by sending at least the first set of data packets having the higher priority to the network. The other data packets, i.e., the data packets which do not have a higher priority, may not be sent to the network. To that end, the method 700 may include continuing the communication session by discontinuing sending of at least a second set of data packets having a lower priority to the network. Furthermore, the method 700 may include detecting that the device temperature of the UE is below the pre-determined threshold. Accordingly, the method 700 may further include resuming sending of at least the discontinued second set of data packets having the lower priority to the network.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. A method of throttling data transmissions in a user equipment (UE), the method comprising:
    determining that a current temperature of the UE is greater than a threshold temperature;
    identifying a set of data transmissions from a plurality of data transmissions occurring at the UE based on a socket priority of each of the plurality of data transmissions; and
    throttling the identified set of data transmissions for a time duration for which the current temperature is determined to be greater than the threshold temperature,
    wherein, in response to the plurality of data transmissions comprising at least one uplink data transmission and at least one downlink data transmission, the socket priority is further determined based on comparing a socket priority of the at least one uplink data transmission with a socket priority of the at least one downlink data transmission, and
    wherein, in response to the plurality of data transmissions comprising at least one uplink data transmission and at least one downlink data transmission, the method further comprises identifying a data transmission from amongst the at least one uplink data transmission and the at least one downlink data transmission, having a lower socket priority, based on the comparison, and throttling the identified data transmission as a part of the identified set of data transmissions.

2. The method of claim 1, wherein each of the plurality of data transmissions is an uplink data transmission, and wherein throttling the identified set of data transmissions further comprises:
    buffering a plurality of data packets corresponding to the identified set of data transmissions in a buffer storage space; and
    releasing the plurality of data packets for uplink transmission, upon determining the current temperature to be lower than the threshold temperature.

3. The method of claim 2, further comprising:
    determining an occupancy of the buffer storage space to be greater than or equal to a storage space threshold; and
    discarding additional data packets corresponding to the identified set of data transmissions, based on determining the occupancy of the buffer storage space to be greater than or equal to the storage space threshold.

4. The method of claim 1, wherein each of the plurality of data transmissions is a downlink data transmission, and wherein throttling the identified set of data transmissions further comprises:
    generating a control request to adjust a transmission window size associated with the data transmission of the identified set of data transmissions; and
    transmitting the generated control request to a network node associated with the data transmission of the identified set of data transmissions.

5. The method of claim 1, wherein the plurality of data transmissions comprises one or more uplink data transmissions and one or more downlink data transmissions,
    wherein the identified set of data transmissions is identified to comprise the one or more uplink data transmissions, and
    wherein throttling the identified set of data transmissions further comprises:
    transmitting a plurality of data packets of the one or more uplink data transmissions based on a UE-defined transmission cycle, wherein the transmission of the plurality of the data packets is suspended for an OFF period of the UE-defined transmission cycle.

6. A user equipment (UE) configured to throttle data transmissions, the UE comprising:
    a communication unit;
    a storage unit; and
    a controller electrically coupled to the communication unit and the storage unit, wherein the controller is configured to:
        monitor a current temperature of the UE;
        determine that a current temperature of the UE is greater than a threshold temperature;
        identify a set of data transmissions from a plurality of data transmissions occurring at the UE based on a socket priority of the plurality of data transmissions; and
        throttle the identified set of data transmissions for a time duration for which the current temperature is determined to be greater than the threshold temperature,
    wherein, in response to the plurality of data transmissions comprising at least one uplink data transmission and at least one downlink data transmission, the socket priority is further determined based on comparing a socket priority of the at least one uplink data transmission with a socket priority of the at least one downlink data transmission, and the controller is further configured to identify a data transmission from amongst the at least one uplink data transmission and the at least one downlink data transmission, having a lower socket priority, based on the comparison, and throttle the identified data transmission as a part of the identified set of data transmissions.

7. The UE of claim 6, wherein each of the plurality of data transmissions is an uplink data transmission, and wherein the controller is further configured to:
    buffer a plurality of data packets corresponding to the identified set of data transmissions in a buffer storage space; and
    release the plurality of data packets for uplink transmission, upon determining the current temperature to be lower than the threshold temperature.

8. The UE of claim 7, wherein the controller is further configured to:
    determine an occupancy of the buffer storage space to be greater than or equal to a storage space threshold; and
    discard additional data packets corresponding to the identified set of data transmissions, based on determining the occupancy of the buffer storage space to be greater than or equal to the storage space threshold.

9. The UE of claim 6, wherein each of the plurality of data transmissions is a downlink data transmission, and
    wherein the controller is further configured to:
    generate a control request to adjust a transmission window size associated with the data transmission of the identified set of data transmissions; and
    transmit the generated control request to a network node associated with the data transmission of the identified set of data transmissions.

10. The UE of claim 6, wherein the plurality of data transmissions comprises one or more uplink data transmissions and one or more downlink data transmissions,
    wherein the identified set of data transmissions is identified to comprise the one or more uplink data transmissions, and
    wherein the controller is further configured to:
    transmit a plurality of data packets of the one or more uplink data transmissions based on a UE-defined transmission cycle, wherein the transmission of the plurality of the data packets is suspended for an OFF period of the UE-defined transmission cycle.

* * * * *